United States Patent
Crespi

(10) Patent No.: US 7,178,451 B2
(45) Date of Patent: Feb. 20, 2007

(54) PISTON FOR METERING EQUIPMENT USED IN THE FOOD AND/OR CHEMICAL AND PHARMACEUTICAL INDUSTRIES IN PARTICULAR, WITH IMPROVED SEAL SYSTEMS

(76) Inventor: Carlo Crespi, Case Nove Torrano, Ponte Dell 'Olio (PC) (IT) 29028

( * ) Notice: Subject to any disclaimer, the term of this patent is extended or adjusted under 35 U.S.C. 154(b) by 36 days.

(21) Appl. No.: 11/078,441

(22) Filed: Mar. 14, 2005

(65) Prior Publication Data
US 2005/0263002 A1    Dec. 1, 2005

(30) Foreign Application Priority Data
May 26, 2004    (IT)    .............................. 2004 A 0022

(51) Int. Cl.
*F16J 1/06*    (2006.01)
(52) U.S. Cl. .......................................... 92/194; 92/193
(58) Field of Classification Search ................. 92/193, 92/194, 197, 199, 200
See application file for complete search history.

(56) References Cited
U.S. PATENT DOCUMENTS 1,868,075 A * 7/1932 Reiland et al. ................ 92/193
2,059,729 A * 11/1936 Dick ............................. 92/182
2,927,830 A * 3/1960 Workman ...................... 92/194
4,669,369 A * 6/1987 Holt et al. ..................... 92/160
4,804,290 A * 2/1989 Balsells ........................ 403/326
5,603,512 A * 2/1997 Lawrence et al. ........... 277/446

FOREIGN PATENT DOCUMENTS
EP    1151922    *    7/2001

* cited by examiner

*Primary Examiner*—Hoang Nguyen
(74) *Attorney, Agent, or Firm*—Young & Thompson

(57) ABSTRACT

A piston designed for use in metering machines employed in the food, chemical and pharmaceutical industries. The piston preferably has a cylindrical body with an annular bead in an intermediate position, a cap made of material designed to form a seal against the cylinder wall, which cap is fitted onto the body, and an annular support with an expansion spring, housed in a groove in the inner wall of the cap, the cap having an annular bead on the free edge; a clamping ring with a groove designed to fit onto the annular bead of the cap and onto the annular bead on the piston body is provided to keep the elements joined together, and the ring also acts as a guide for the piston against the cylinder wall.

7 Claims, 2 Drawing Sheets

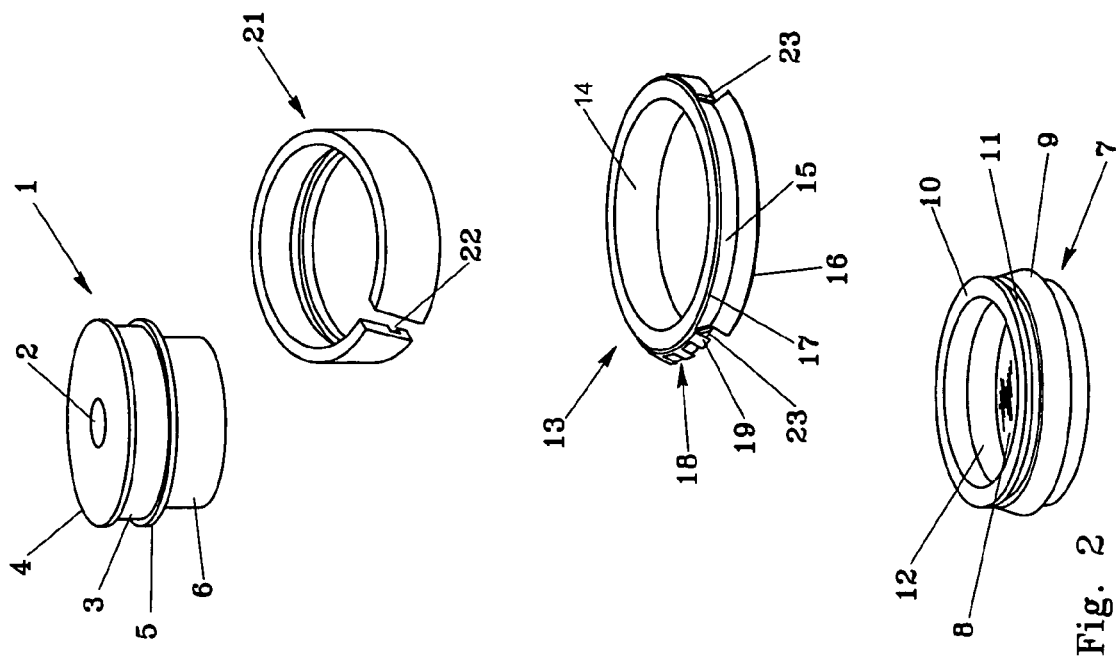
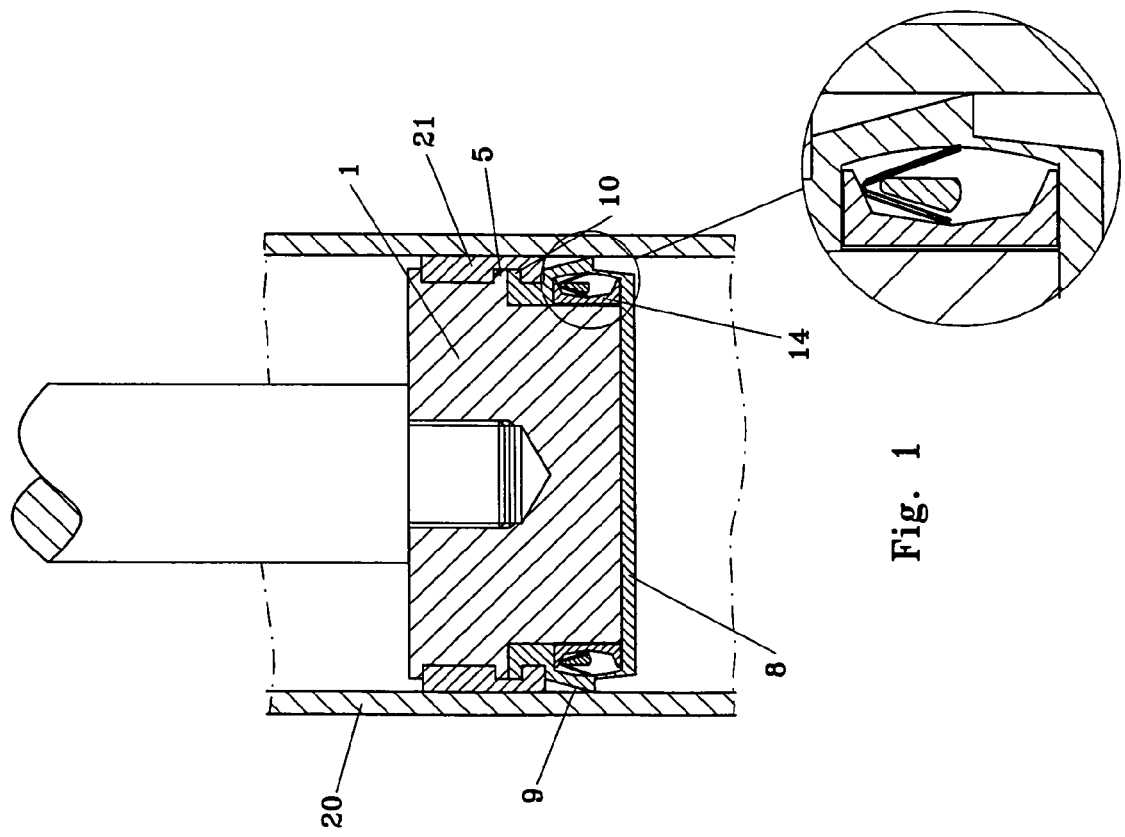
Fig. 2
Fig. 1

PISTON FOR METERING EQUIPMENT USED IN THE FOOD AND/OR CHEMICAL AND PHARMACEUTICAL INDUSTRIES IN PARTICULAR, WITH IMPROVED SEAL SYSTEMS

This invention relates to a piston designed for use in metering machines employed in the food, chemical and pharmaceutical industries; said piston features improved seal systems, in particular seals with an annular support inserted in a seating made in the body of the piston which has a perimeter groove, with an expandable steel spring element inserted in said groove, and a seal element that surrounds said annular support on the outside and is subject to the action of said spring which keeps it constantly pressed against the walls of the metering cylinder.

The piston preferably has a cylindrical body with an annular bead in an intermediate position, a cap made of material designed to form a seal against the cylinder wall, which said cap is fitted onto said body, and an annular support with an expansion spring, housed in a groove in the inner wall of the cap, said cap having an annular bead on the free edge; a clamping ring with a groove designed to fit onto said annular bead of the cap and onto said annular bead on the piston body is provided to keep said elements joined together, and said ring also acts as a guide for the piston against the cylinder wall.

The piston thus made has a very simple design, consisting of only a few parts, is quick and easy to assemble and, above all, forms an excellent seal with the cylinder wall, which remains constant over time, without forming cavities, undercuts or other spaces in which the product could be deposited, with the risk that it could ferment or deteriorate with time.

The equipment used in the food and pharmaceutical industries must be made according to very strict hygiene criteria, and the conditions of use are equally strict, requiring thorough cleaning of the equipment at intervals of a few hours or days, depending on the type of product treated and the characteristics of the equipment.

In particular, designers in this field tackle every day the problem of designing machines in which the surfaces that come into contact with the product are as free as possible of corners, cavities, undercuts and otherwise irregular surfaces that include areas in which the product may be deposited and then ferment or deteriorate, with the result that the entire production batch has to be discarded and the machines shut down for cleaning and maintenance work.

The present invention relates to this sector, and in particular to the piston-operated volumetric metering equipment used in said industries.

In most of these machines, the active part that meters the product is constituted by a piston which operates in a cylindrical chamber and delivers a larger or smaller quantity of product, depending on its stroke.

These pistons are fitted with suitable seals which form a perfect seal against the wall of the cylinder to ensure that not the slightest trace of the product adheres to the walls.

European patent application no. 1,151,922, filed by the present applicant, describes an aseptic seal for use in metering machines used in the food industry, which is designed in such a way as to prevent infiltration or sedimentation of the product along the circumference of the seal, which consists of two parts: a sealed outer covering made of a material suitable to withstand dynamic stresses and a second element, housed inside the first so as to prevent all possible infiltration of material, which is able to withstand static compression and exerts a pushing action against the side walls of the outermost material so as to form a seal on contact with the cylinder wall.

This type of seal for the piston of a metering unit has good operating characteristics, but could still be improved on. The plastic used for the internal element possesses a degree of "memory", ie. the ability to recover its original shape after stresses and deformations, so that it has a limited capacity to compensate for deterioration of the outer ring caused by wear, with the result that after a certain number of hours' work the seal must be replaced because, although it is not completely worn out, it no longer exerts sufficient pressure against the cylinder walls to guarantee the required tightness.

This problem is solved by present invention, which involves fitting a plastic cap shaped in such a way as to form a seal with the cylinder wall onto the last section of the piston and inserting an annular support with a perimeter groove into a groove in said cap, a steel spring-loaded element inserted into said cap groove exerting an outward thrust against the cap wall so as to keep it pressed against the cylinder wall.

The invention also relates to a seal for the pistons of metering equipment which comprises an outer annular body designed to be fitted onto the piston to form the seal and an inner annular body to be inserted into said outer annular body, which said inner body contains a groove which houses an expandable steel spring-loaded element which acts from the inside on said outer annular element to keep it pressed against the cylinder wall.

This invention will now be described in detail, by way of example but not of limitation, by reference to the annexed figures wherein:

FIG. 1 illustrates, in cross-section, a piston for metering equipment according to the invention, assembled and inserted into the cylindrical chamber;

FIG. 2 is an exploded view of the piston according to the invention;

Figure 4:
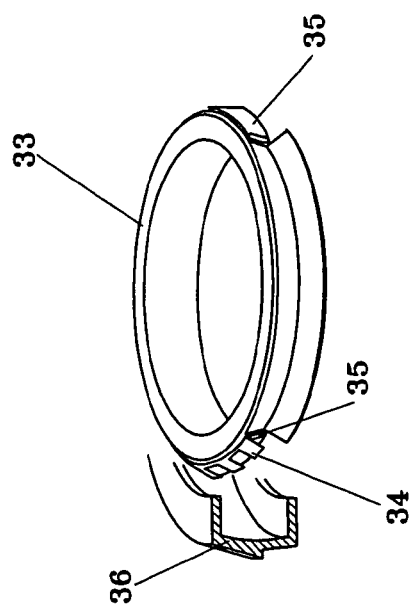
FIGS. 4 and 5 illustrate, in perspective view, the inner element and outer element respectively of the seal fitted on the piston shown in FIG. 3.

As shown in FIGS. 1 and 2, the piston according to the invention comprises a substantially cylindrical body 1, fitted with a coupling 2 for application of the piston rod, the base of which said body presents a groove 3 bounded by an end wall 4 and an annular bead 5, the remaining cylindrical section of body 1 being shown as no. 6.

A cap 7 which has a head wall 8 and a side wall 9 is fitted to section 6 of piston 1. At the end of wall 9 there is an annular bead 10 which has substantially the same diameter as bead 5 of the piston body, an annular groove 11, and a convex wall section connected to wall 8.

The inside of cap 7 presents an annular seating 12 designed to house a seal unit 13.

Seal unit 13 comprises an annular support 14 with a perimeter groove 15 which defines a pair of side walls 16 and 17 and is designed to receive a spring-loaded element 18, which is preferably V-shaped and shaped to form a plurality of wings 19 on the outer edge that tend to open outwards so as to press on wall 9 of cap 7 and keep it pressed against wall 20 of the chamber in which the piston moves.

A plastic ring 23 is inserted into spring 18 to hold it in position, retaining it inside support 14.

The piston is completed by an open ring 21, cut in an inclined direction, which has a smooth outer surface, while the inner part is shaped to form a groove 22 designed to receive annular bead 10 of the cap and bead 5 of body 1, joined together.

The inner diameter of both support 14 and cap 7 is equal to the outer diameter of section 6 of piston 1.

In order to assemble the piston, spring-loaded element 18 is inserted into the perimeter groove of annular support 14 and locked into position by means of ring 23; the assembly is then inserted into the cap, where it is housed in annular groove 12, with wings 19 of the spring pressing radially outwards against the cap wall.

The cap is then fitted onto section 6 of piston body 1 until annular bead 10 is in contact with annular bead 5 of body 1.

Ring 21, which can open as a result of the inclined notch, is then inserted, and groove 22 fits round joined beads 10 and 5.

The assembly has the configuration shown in cross-section in FIG. 1.

The piston is now ready to be inserted into cylindrical chamber 20, with the outer surface of ring 21 acting as a guide and the convex outer surface 9 of the cap forming a seal with the chamber wall.

The piston thus obtained does not present any undercuts, cavities or seatings in the areas in contact with the product in which the product is liable to lodge, and is easy and fast to assemble.

During use, wings 19 of spring 18 act on the side wall of cap 7, pushing it outwards in such a way as to keep it constantly pressed against wall 20 of the chamber, thus compensating for any play or wear.

Figure 5:
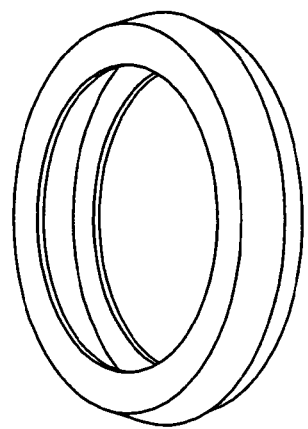
Figure 3:
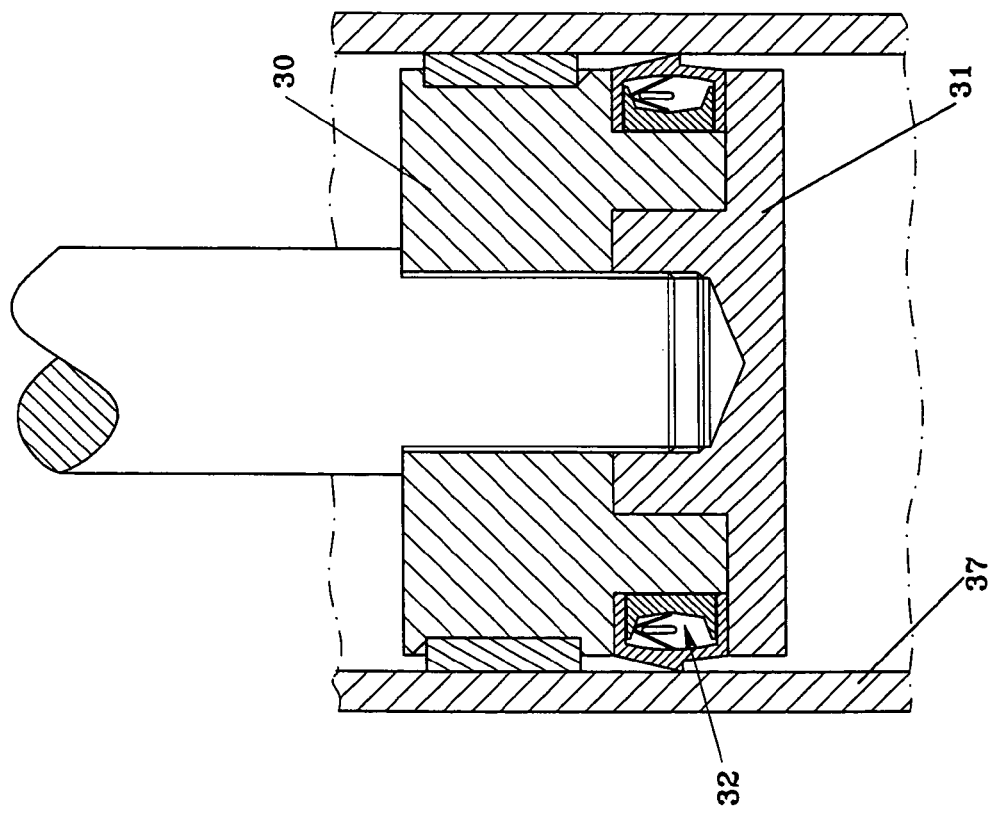
FIG. 3 illustrates, in cross-section, a piston for metering equipment fitted with a seal made in accordance with the invention.

A further preferred embodiment of the invention is illustrated in FIGS. 3 to 5.

Here, the piston is constituted by a body 30 and a head plate 31 which are assembled, forming a seating for the insertion of a seal 32 between them.

Here again, seal 32 comprises an inner annular support 33, between the side walls of which a spring-loaded element 34 is inserted and held in position by a ring 35.

Support 33 with spring 34 is then inserted into an annular seal 36 which, on assembly of the piston, is clamped between body 30 and head plate 31.

Once again the piston, when assembled, does not present undercuts or cavities in the area in contact with the product, and the seal is kept constantly pressed against chamber wall 37 due to the force exerted by spring 34.

An expert in the field could devise various modifications and variations, all of which should be deemed to fall within the ambit of this invention.

The invention claimed is:

1. Piston for metering equipment with improved seal system, which includes sealing means constituted by a seal comprising an outer part (7, 36) in contact with the wall (20, 37) of the cylinder in which the piston moves and an inner part (14, 33) made of a different material from the outer part, which said inner part presents a perimeter groove in which are inserted elastic means (18, 34) that press on said outer part of the seal to keep it in contact with the cylinder wall, and further comprising:
   a cylindrical body (1) which presents an annular groove (3) at one end that defines an outer bead (4) and an inner bead (5);
   a cap (7), designed to be fitted over said annular body (1), which said cap presents an outer groove (11) at the base that defines an annular bead (10) having the same diameter as said inner annular bead (5) of cylindrical body (6), and an inner annular groove (12);
   an annular support (14) inserted into said groove (12) present in cap (7), which said annular support contains a perimeter groove (15) in which is inserted a spring-loaded element (18) that opens outwards, which said spring-loaded element acts on the side wall of said cap to press it against wall (20) of the cylinder in which the piston moves;
   a ring (21) which presents an inner groove (22) designed to fit round said annular bead (5) of said body and said annular bead (10) of said cap, to retain the assembly in position.

2. Piston for metering equipment as claimed in claim 1, wherein said outer part (7) of the seal consists of a cap that covers the piston head.

3. Piston for metering equipment as claimed in claim 1, wherein said spring-loaded element (18) is constituted by an element with a V-shaped section which presents a plurality of notches on at least one of the walls that form a series of wings, which said spring-loaded element is inserted into said perimeter groove (15) of said annular support (14) so that said wings project outwards and engage the wall of said cap (7), a ring (23) being fitted into said spring to retain it in position in said perimeter groove.

4. Piston for metering equipment with an improved seal system as claimed in claim 1, which includes a seal element constituted by an annular seal (36) mounted on the body of said piston (30), inside which is inserted an annular support (33) that presents a perimeter groove in which a spring-loaded element (34) acts on the inner wall of said seal (36), exerting an outward radial thrust, which tends to dilate said seal in order to keep it in constant contact with wall (37) of the cylinder in which said piston moves.

5. Piston for metering equipment as claimed in claim 4, wherein said annular seal (36) surrounds said ring (33) on three sides.

6. Piston for metering equipment as claimed in claim 4, wherein said spring-loaded element (18, 34) is made of steel with a V-section and presents a plurality of wings that open outwards.

7. Piston as claimed in claim 4, which includes a ring (35) inserted into said spring-loaded element to retain it in position in said annular support (33).

* * * * *